W. O. TALCOTT.
BELT FASTENER.
APPLICATION FILED JAN. 13, 1916.

1,212,712.  Patented Jan. 16, 1917.

Witnesses
W. H. Bardsley.
A. J. Macrady.

Inventor
Walter O. Talcott.
By Howard E. Barlow
Attorney

UNITED STATES PATENT OFFICE.

WALTER O. TALCOTT, OF PROVIDENCE, RHODE ISLAND, ASSIGNOR OF ONE-HALF TO MANCEL W. TALCOTT, OF PROVIDENCE, RHODE ISLAND.

BELT-FASTENER.

1,212,712.  Specification of Letters Patent.  Patented Jan. 16, 1917.

Application filed January 13, 1916. Serial No. 71,886.

*To all whom it may concern:*

Be it known that I, WALTER O. TALCOTT, a citizen of the United States, and resident of the city of Providence, in the county of Providence and State of Rhode Island, have invented certain new and useful Improvements in Belt-Fasteners, of which the following is a specification.

This invention relates to belt fasteners of the class designed to connect together the ends of belts employed for driving machinery, and the primary object of this invention is to form such a fastener of a thin plate having one or more holes near its opposite edges through which rivets or other fastenings may be passed and to also provide this plate with a gage member, for the purpose of engaging the edge of the belt to serve as a templet for first punching the rivet holes in the belt and then to serve as a gage for positioning the plate between the belt layers to cause the rivet receiving holes therein to register with those punched in the belt.

By forming a gage-lip, or member on the plate, and so adapting it to serve as a templet by which to punch the rivet holes through the belt, I obviate the necessity of carrying a special templet for each fastener, and by the use of a plate so constructed even an unskilled mechanic may accurately punch the holes in the belt even when obliged to work in the most inconvenient places. After the belt has been punched the plate may be positioned between the layers to positively insure the fastening of the belt ends in perfect alinement one with the other, which is of utmost importance in the connecting of belt ends, to insure the true running of the belt.

With these and other objects in view, the invention consists of certain novel features of construction, as will be more fully described, and particularly pointed out in the appended claims.

Figure 1:
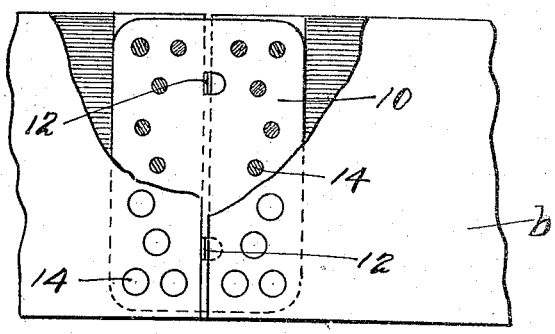
Figure 2:
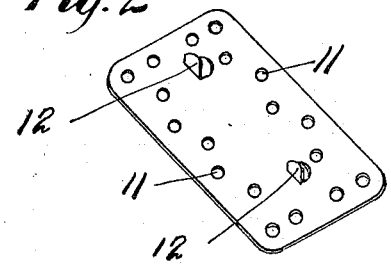
Figure 4:
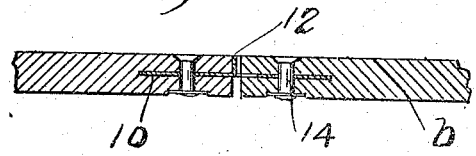
Figure 3:
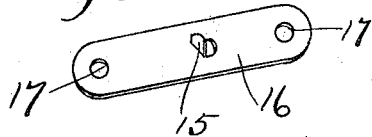

In the accompanying drawings, Figure 1 is a plan view showing my improved fastener as applied to and connecting together the adjacent ends of a belt, the plies of the belt ends being broken away to better show the plate inserted between them. Fig. 2 is a perspective view of the fastener plate formed of sheet metal, the same being wide enough to serve as a single fastener for a belt of some considerable width. Fig. 3 shows a narrow plate, a number of which are usually employed in attaching together the belt ends. Fig. 4 is a sectional view showing the plate as inserted between the layers or ply of the belt and riveted in position therein.

Referring to the drawings my improved fasteners are designed to be used between the layers or plies of rubber, canvas, leather or other belting $b$ and preferably consists of a thin plate 10 of pliable or yieldable material such as sheet metal or the like. When this plate is constructed of a width to take in the whole of the belt, it is provided with a plurality of holes 11 formed through it along its opposite edges for the reception of rivets, nails or other fastenings by which it is secured to the ends of the belt. This particular design of fastener plate is constructed of thin or sheet metal for several reasons among others being; first, that the plate is rendered flexible and yieldable and will bend in either direction to accommodate itself to the curvature of the belt while running alternately over and under the pulleys; second, a plate so constructed is very strong and durable and although thin and yieldable its strength is much greater than that of the belt and will stand long and severe usage; third, a fastener plate formed of this thin sheet metal may be very readily passed between the layers or plies of the belting. Another essential feature in the forming of this plate of sheet metal is that the rib, lip or other form of gage member may be arranged to project from the surface of the plate to a height corresponding approximately to one-half of the thickness of the belt, said projecting member being located intermediate the opposite ends of the plate. Then again by constructing this plate of sheet metal these lips 12 may be cut from the stock and raised from the body of the plate all in the same operation that forms the rivet holes.

In applying my improved fasteners, the perforated plate is first placed upon the outside surface of the belt, with the projecting lips 12, pressed close against the end of the belt, thus making a gage, or templet of the fastener which enables the operator to punch or pierce the holes 11 in the belt so they will exactly correspond in position with the holes 11 in the plate or fastener. The middle plies of the belt are then separated and the perforated plate is inserted between the plies, and the projecting lips 12, are pressed against the end of the belt as before. This brings the holes of the plate exactly in line with the holes in the belt ready to receive the fastenings 14 which are then inserted through the plies of the belt and the intermediate plate and clenched or riveted, on the opposite side. If my perforated plate 10 was not provided with these projecting lips or guide members, it would be necessary to have a separate pattern or templet for each plate for punching or piercing the holes so they would match the plate, but with the addition of these projecting lips, my belt fastener also becomes a templet or pattern for punching or piercing the holes so that they will exactly coincide with the holes in the plate thus insuring perfect work even when performed by an inexperienced mechanic. This feature is of utmost importance in the connecting together of belt ends as it is well known by those practised in the art that unless the ends are connected in perfect alinement one with the other that one side of the belt becomes tighter than the other causing the belt to constantly run off its pulleys.

These fasteners may be made in various sizes and forms. In some cases I make them of a narrow piece of plate 16, see Fig. 3, having but one hole 17 near each of its opposite edges, and I provide this plate with a central projecting lip 15 or other guide member for holding the plate in position or they may consist of a single narrow strip with one or two perforations on each end and one or two projecting lips or members.

In applying my improved fastener to a belt of a single ply the belt may be split along its end for receiving the wide plates or insertions may be made in the end of the belt with a tool made for this purpose for receiving the narrow plates.

In places where a particularly smooth joint is required the plate may be made of this spring metal or other material and the heads of the rivets may be countersunk into the belt, making a perfectly smooth fastening which will be safe for the operator to handle.

The edge of the plate next to the perforations may be square or rounded, or it may be suitably beveled so as to decrease the liability of cutting or cracking the belting when it passes around the pulley.

I preferably form the gage member integral with the plate by raising a portion of the stock therefrom, but this gage member may be made in any way and connected to the plate by any suitable means.

I do not wish to limit myself to the use of my improved fastener plate exclusively on the inside or between the layers of the belt, as in some cases the plate may be applied to the outer surface of the belt if desired, the lips in both cases serving as a gage for accurately punching or forming the rivet holes through the belt.

It will be seen that a perforated plate without my protecting lips, is liable to slide about and change its position while driving split rivets, or nails into the belt, but by providing a lip and pressing the same firmly against the end of the belt, the plate can be held in a positive position even when the operation is being performed in inconvenient places or under adverse circumstances.

I have described one illustrative embodiment of my invention but I desire it to be understood that although specific terms are employed they are used in a generic and descriptive sense and not for the purpose of limitation, the scope of the invention being set forth in the following claims.

I claim:

1. A belt fastener comprising a plate adapted to be inserted between the belt layers, said plate being provided with one or more rivet holes for receiving fastenings passed through each end of the belt, and a gage member raised above the plane of said plate adapted to engage the belt ends to serve as a templet for positioning the holes and the rivets in the belt.

2. A belt fastener comprising a sheet metal plate adapted to be readily inserted between the belt layers, said plate being provided with one or more rivet holes for receiving fastenings passed through each end of the belt, and one or more gage lips raised from the body of the stock intermediate its ends to engage the belt ends and serve as a templet for first punching the rivet holes in the belt and then as a gage for positioning the plate between the layers, to cause its rivet holes to register with those in the belt.

In testimony whereof I affix my signature in presence of two witnesses.

WALTER O. TALCOTT.

Witnesses:
 HOWARD E. BARLOW,
 A. F. MACREADY.

Copies of this patent may be obtained for five cents each, by addressing the "Commissioner of Patents, Washington, D. C."